US012584797B1

(12) United States Patent
Vuchetich

(10) Patent No.: US 12,584,797 B1
(45) Date of Patent: Mar. 24, 2026

(54) MULTISENSOR TEMPERATURE MONITOR AND ALERTING SYSTEM

(71) Applicant: Arxsine, Norfolk, NE (US)

(72) Inventor: Phillip J. Vuchetich, Norfolk, NE (US)

(73) Assignee: Arxsine, Norfolk, NE (US)

( * ) Notice: Subject to any disclaimer, the term of this patent is extended or adjusted under 35 U.S.C. 154(b) by 350 days.

(21) Appl. No.: 18/129,693

(22) Filed: Mar. 31, 2023

Related U.S. Application Data

(60) Provisional application No. 63/326,147, filed on Mar. 31, 2022.

(51) Int. Cl.
G01K 1/02 (2021.01)
G01K 13/00 (2021.01)

(52) U.S. Cl.
CPC ............. G01K 1/026 (2013.01); G01K 13/00 (2013.01)

(58) Field of Classification Search
None
See application file for complete search history.

(56) References Cited

U.S. PATENT DOCUMENTS

| | | | |
|---|---|---|---|
| 8,342,748 B2 | 1/2013 | Gierer | |
| 9,470,587 B1 | 10/2016 | Greene | |
| 9,518,943 B2 | 12/2016 | Hogan et al. | |
| 9,714,872 B1 | 7/2017 | Greene | |
| 10,330,537 B2 | 6/2019 | Koduri | |

| | | | |
|---|---|---|---|
| 2013/0301673 A1 | 11/2013 | Mobley et al. | |
| 2014/0056325 A1 | 2/2014 | Guerra et al. | |
| 2015/0182130 A1* | 7/2015 | Utter, II ............... | A61B 5/0024 |
| | | | 600/483 |
| 2018/0028072 A1* | 2/2018 | Shi ...................... | A61B 5/6833 |
| 2019/0301948 A1 | 10/2019 | Goulis et al. | |
| 2020/0096393 A1 | 3/2020 | Lion et al. | |

FOREIGN PATENT DOCUMENTS

| | | |
|---|---|---|
| EP | 0928935 B1 | 4/2005 |
| EP | 2233899 B1 | 9/2015 |
| EP | 3581900 A1 | 12/2019 |
| EP | 3475088 A4 | 1/2020 |
| GB | 2114363 A | 8/1983 |

(Continued)

OTHER PUBLICATIONS

"Temperature Monitor with dual sensors,"; Texas Instruments, URL: https://www.ti.com/tool/TIDA-060034.

(Continued)

*Primary Examiner* — Erica S Lin

(74) *Attorney, Agent, or Firm* — Sulter Swantz IP

(57) ABSTRACT

A temperature probe of a temperature monitoring system includes a circuit board substrate, a first temperature sensor disposed on a first side of the circuit board substrate, and a second temperature sensor disposed on a second side of the circuit board substrate opposite the first side. The temperature probe also includes a controllers disposed on the circuit board substrate. The controller is configured to receive a first temperature signal from the first temperature sensor; receive a second temperature signal from the second temperature sensor; generate comparison data based on the first temperature signal and the second temperature signal; and transmit a data signal based on the comparison data to a network monitoring system.

20 Claims, 7 Drawing Sheets

100

(56) References Cited

FOREIGN PATENT DOCUMENTS

| | | | |
|----|------------|----|--------|
| GB | 2405477 | A | 3/2005 |
| IL | 214564 | A | 8/2010 |
| TW | 473983 | B | 2/2015 |
| WO | 2019100101 | A1 | 5/2019 |

OTHER PUBLICATIONS

NSF/ANSI 456-2021a, Vaccine Storage, Apr. 25, 2021.
URL: https://www.nist.gov/news-events/news/2021/06/new-standard-vaccine-fridges-unveiled.

* cited by examiner

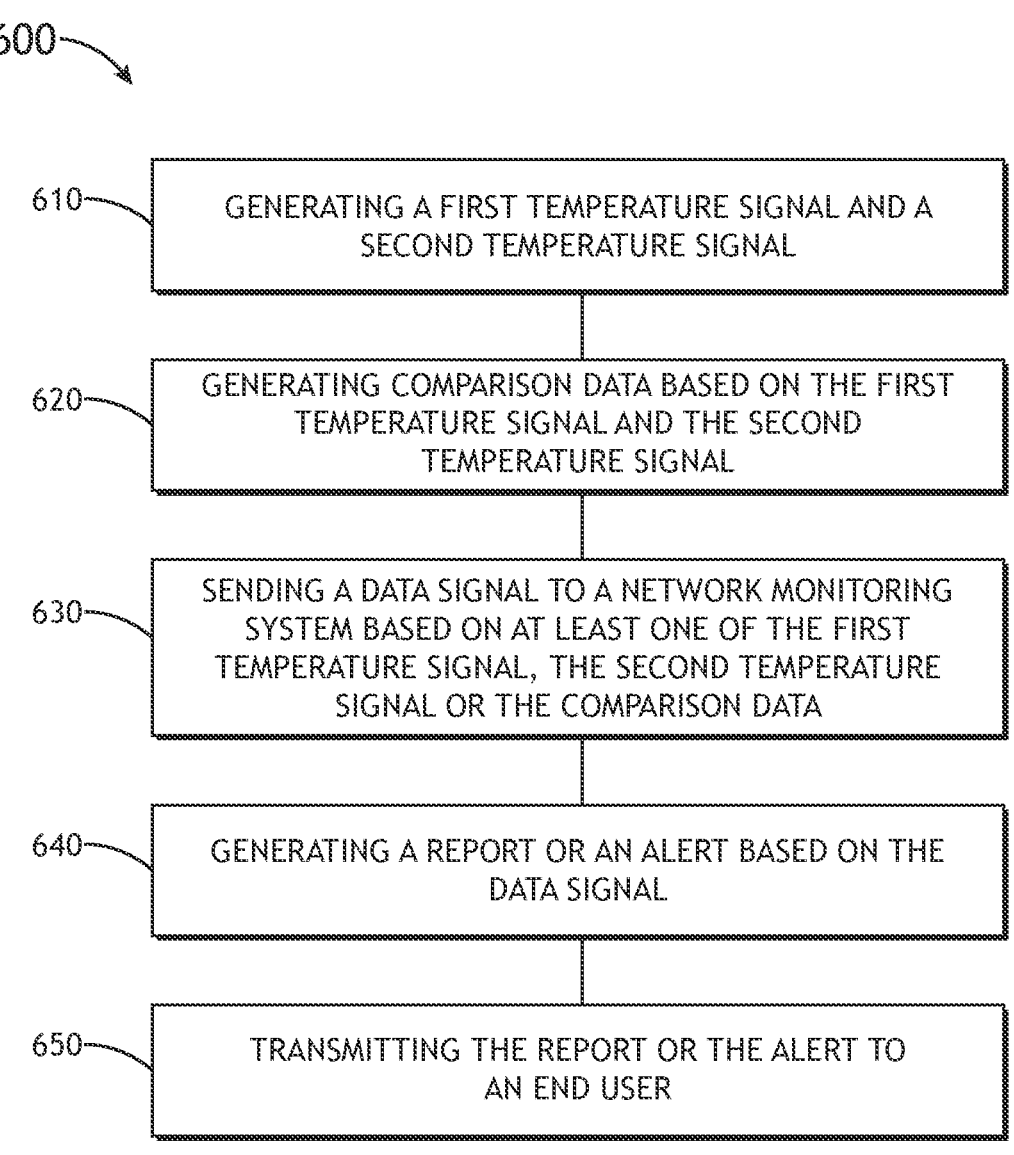

600

610 — GENERATING A FIRST TEMPERATURE SIGNAL AND A SECOND TEMPERATURE SIGNAL

620 — GENERATING COMPARISON DATA BASED ON THE FIRST TEMPERATURE SIGNAL AND THE SECOND TEMPERATURE SIGNAL

630 — SENDING A DATA SIGNAL TO A NETWORK MONITORING SYSTEM BASED ON AT LEAST ONE OF THE FIRST TEMPERATURE SIGNAL, THE SECOND TEMPERATURE SIGNAL OR THE COMPARISON DATA

640 — GENERATING A REPORT OR AN ALERT BASED ON THE DATA SIGNAL

650 — TRANSMITTING THE REPORT OR THE ALERT TO AN END USER

FIG.6

MULTISENSOR TEMPERATURE MONITOR AND ALERTING SYSTEM

CROSS-REFERENCE TO RELATED APPLICATION

The present application claims the benefit under 35 U.S.C. § 119(e) of U.S. Provisional Application Ser. No. 63/326,147, filed Mar. 31, 2022, entitled MULTISENSOR TEMPERATURE MONITOR AND ALERTING SYSTEM, naming Phillip J. Vuchetich as inventor, which is incorporated herein by reference in the entirety.

TECHNICAL FIELD

The present invention generally relates to temperature sensing probes, and in particular to temperature sensing probes for use in temperature monitoring systems

BACKGROUND

Refrigeration systems require temperature monitoring to ensure that the refrigeration equipment is performing properly. Temperature probes used in temperature monitoring systems often require time-consuming certification and calibration procedures. Once certified and/or calibrated, these probes may still drift over time, leading to inaccurate measurements that may not be noticed or addressed until the next certification or calibration. Therefore, it is desirable to provide a product and method that avoids the shortcomings of conventional approaches.

SUMMARY

A temperature monitoring system is disclosed, in accordance with one or more illustrative embodiments. In one illustrative embodiment, the system includes a temperature probe. In another illustrative embodiment, the temperature probe includes a circuit board substrate; a first temperature sensor disposed on a first side of the circuit board substrate; a second temperature sensor disposed on a second side of the circuit board substrate opposite the first side; and one or more controllers disposed on the circuit board substrate. In another illustrative embodiment, the one or more controllers include one or more processors; and a memory communicatively coupled to the one or more processors, wherein the memory stores a set of program instructions, the set of program instructions configured to cause the one or more processors to: receive a first temperature signal from the first temperature sensor; receive a second temperature signal from the second temperature sensor; generate comparison data based on the first temperature signal and the second temperature signal; and transmit a data signal based on the comparison data to a network monitoring system.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures.

FIG. 6 is a flow diagram illustrating a method for communicating temperature data to an end user via a temperature monitoring system, in accordance with one or more embodiments of the disclosure.

DETAILED DESCRIPTION OF THE INVENTION

Reference will now be made in detail to the subject matter disclosed, which is illustrated in the accompanying drawings.

Embodiments of the present disclosure are directed to a temperature probe within a temperature monitoring system. The temperature probe that includes two temperature sensors that act to compare readings to each other to detect accuracy drift. The sensors are packed within a form factor (e.g., aluminum alloy) that may mimic sample containers, such as vaccine vials. The probe includes electronics that facilitate connections to a network, and reporting of sensor values to the network. The temperature sensing probe replaces traditional temperature monitors (e.g., individual probes in vials filled with propylene glycol) and temperature monitoring systems that rely on single-sensor temperature probes. The temperature monitoring system may be configured to monitor for failure conditions that may cause spoilage of refrigerated or frozen materials due to temperature excursions outside of a defined range.

Figure 1:
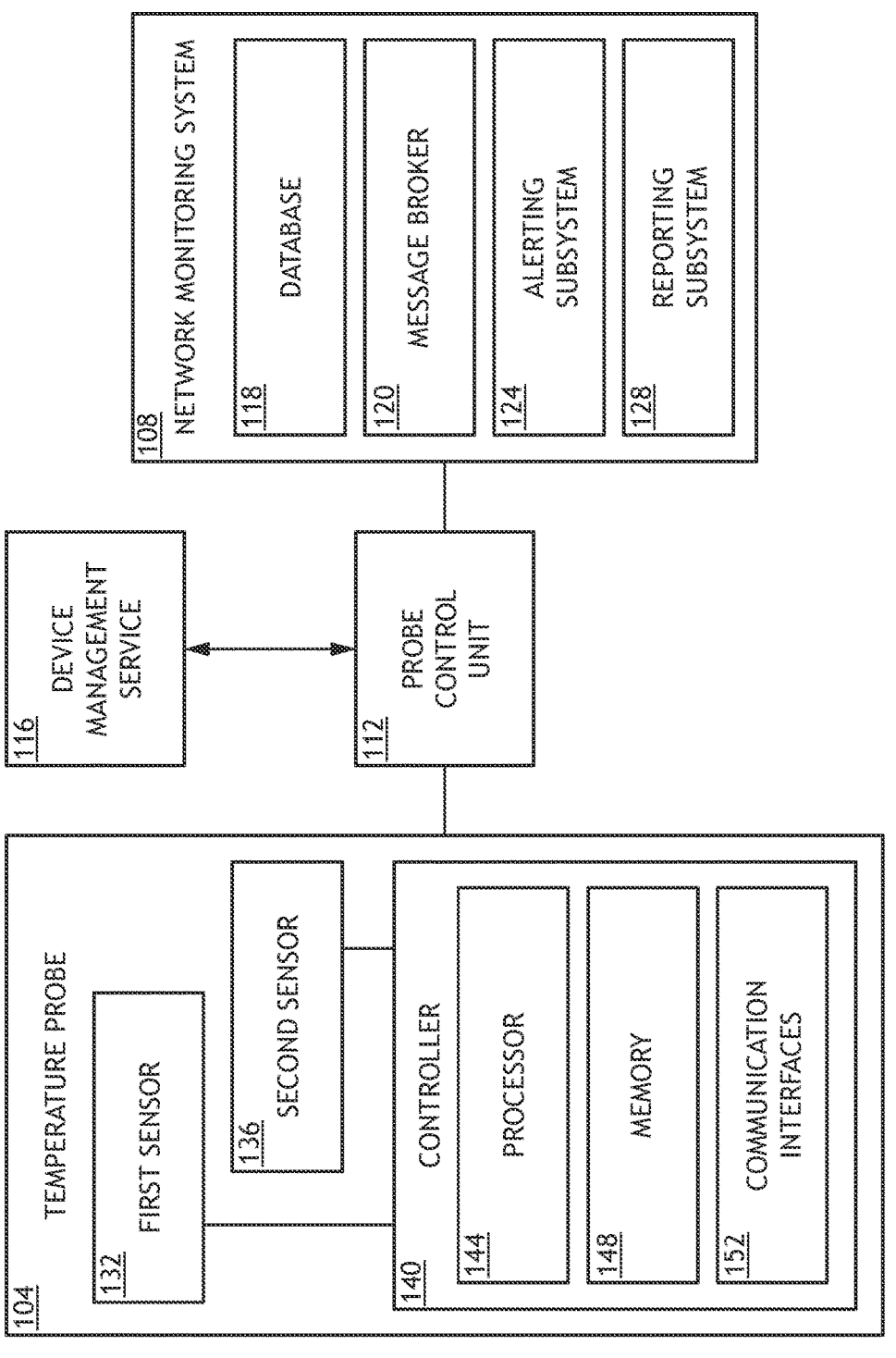
FIG. 1 is a block diagram illustrating a temperature monitoring system, in accordance with one or more embodiments of the disclosure.

FIG. 1 is a block diagram illustrating a temperature monitoring system 100 in accordance with one or more embodiments of the disclosure. The temperature monitoring system 100 may be configured for any type of temperature measurement scheme including, but not limited to, refrigeration monitoring systems, and heating systems. For example, the temperature monitoring system 100 may be configured as a temperature monitoring system for a refrigerator designed to store vaccine vials. In another example, the temperature monitoring system 100 may be configured as a temperature monitoring system for a set of freezers designed to store frozen food products. In another example, the temperature monitoring system 100 may be configured for a set of warming trays in a restaurant. The temperature monitoring system 100 includes a temperature probe 104 and a network monitoring system 108 communicatively coupled to the temperature probe 104 via a probe control unit 112.

The temperature monitoring system 100 further includes a device management service 116 communicatively coupled to the probe control unit 112 and configured to send software/firmware updates. For example, the device management service 116 may be configured to send temperature probe firmware updates and/or device configuration settings for the temperature probe 104 to the probe control unit 112 that are then relayed to the temperature probe 104. The device management service 116 may also be configured to send updates directly to the temperature probe 104 and/or the network monitoring system 108. The device manage-ment service 116 may be cloud-based (e.g., updates sent from a remote server), or may be local (e.g., updates sent from a local server or computer). Updates may be sent via wireless (e.g., a cellular network) or wireline methods.

The probe control unit 112 includes circuitry configured for processing, programming, and network connectivity. For example, the probe control unit 112 may be configured to communicate with other components of the temperature monitoring system 100 via any wireless or wireline tech-nology including but not limited to cellular (e.g., 4G, 5G) communication technology, internet connectivity (e.g., IPv4 or IPV6), Ethernet, WIFI, Bluetooth, BLE, Z-Wave, 6LOW-PAN, NFC, WIFI Direct, GSM, LTE, LoRa, NB-IOT, and LTE-M. For instance, the probe control unit 112 may be configured to communicate with the device management service 116 via a 5G signal, communicate with the tempera-ture probe 104 via a wired connection using Inter-Integrated Circuit (I2C) or SMBus, and communicate with the network monitoring system 108 via a WIFI signal. Any combination of communication technologies between components of the temperature monitoring system 100 are possible.

The probe control unit 112 may be powered via battery (e.g., three AA batteries) or be pluggable into a power source, including power over ethernet (POE). The probe control unit 112 may be mounted on or near the refrigeration or heating unit to be monitored. For example, the tempera-ture probe 104 may be disposed inside a freezer with the probe control unit 112 located outside of the freezer and attached to the freezer door or freezer side. Functions of the probe control unit 112 may include relaying firmware updates, configuration updates and/or update confirmation messages between the device management service 116 and the temperature probe 104, relaying probe data between the temperature probe 104 and the network monitoring system 108 and relaying communication between the device man-agement service 116 and the network monitoring system 108. In some embodiments, the probe control unit 112 itself includes temperature/humidity measurement devices con-figured to measure ambient temperature and/or humidity.

The network monitoring system 108 receives temperature probe data (e.g., in the form of temperature data signals). The network monitoring system logs data from the tempera-ture probe 104 (e.g., stored in a database 118) and takes action based on the content of data (e.g., signals and messages) sent from the temperature probe 104. In some embodiments, the network monitoring system 108 receives data from the probe control unit 112 (e.g., updates or ambient temperature/humidity data) and/or the device man-agement service 116 and takes action based on the data. The network monitoring system 108 includes electronic circuitry and pre-programmed logic, and is configured to execute specific tasks based on incoming data and the pre-pro-grammed logic. The networking monitoring system 108 further includes, or is further connected to, a message broker 120, an alerting subsystem 124, and a reporting subsystem 128.

The message broker 120 is an intermediary software program that translates messages between componentry within the temperature monitoring system 100. For example, the message broker 120 may facilitate the reception and translation of a message from a network-connected probe control unit 112 that is sent to the network monitoring system 108. The message broker 120 may utilize any type of network protocol including but not limited to MQTT pro-tocols or Constrained Application Protocols (CoAP). For instance, the message broker may facilitate the transfer of secure MQTT-based messages between the probe control unit 112 and the network monitoring system 108.

The alerting subsystem 124 alerts end users of the status of the temperature monitoring system 100 in real time or near real time (e.g., within ten minutes, within ten seconds, or within ten milliseconds). The alerting subsystem 124 may be configured to employ any type of alerting measure including but not limited to sound alerts (e.g., a buzzer) light alerts (e.g., a flashing indicator light), or messages sent to the end user via wireline or wireless communication protocols. For example, the alerting subsystem 124 may be configured to use SMS messaging, and send text messages to the end user. In another example, the alerting subsystem 124 may send an email to an end user. In another example, the alerting subsystem may contact the end user through application programming interfaces APIs via $3^{rd}$ party services includ-ing but not limited to Slack™ Pagerduty™, Microsoft Teams™, and/or helpdesk ticketing systems.

The reporting subsystem 128 sends scheduled and/or on-demand reports of the end user based on data collected from the temperature probe 104. The reporting subsystem 128 may send reports to the end user via any messaging mode as described herein (e.g., texts, emails, or $3^{rd}$ party services). For example, the reporting subsystem 128 may send messages to end users via web browsers or smart phone applications. The reporting subsystem 128 may send sched-ules at any time or any interval including but not limited to hourly, daily, weekly, or monthly.

The temperature probe 104 includes a first sensor 132 and a second sensor 136, each configured to measure and report a temperature (e.g., by transmitting temperature data sig-nals). The first sensor 132 and second sensor 136 may each be configured as any type of temperature sensor including, but not limited to, thermocouples, resistance temperature detectors (RTDs), thermistors, or semiconductor-based inte-grated circuits (e.g., silicon bandgap temperature sensors. For example, the first sensor 132 and/or second sensor 136 may be configured as an integrated circuit-based tempera-ture sensor configured to transmit a digital signal. The first sensor 132 and second sensor 136 may be configured to transmit analog or digital signals. The first sensor 132 and second sensor 136 may each be configured to measure specific ranges of temperatures including but not limited to −55° C. to 150° C., −40° C. to 100° C., and −20° C. to 50° C. The first sensor 132 and second sensor 136 may be communicatively coupled to each other as well as to a controller 140 configured to perform the functionality of the temperature probe 104 as described herein. In some embodi-ments, the first sensor 132 and second sensor 136 are communicatively coupled to their own respective controller 140. The controller 140 may include one or more processors 144, memory 148, and a communication interface 152. In some embodiments, the temperature probe 104 includes more than two sensors.

The one or more processors 144 may include any pro-cessor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 144 may include any device configured to execute algorithms and/or instructions (e.g., program instructions stored in memory 148). Moreover, different subsystems of the temperature probe 104 may include a processor or logic elements suitable for carrying out at least a portion of the steps described in the present disclosure. Therefore, the above description should not be interpreted as a limitation on the embodiments of the present disclosure but merely as an illustration.

The memory 148 may include a tangible, computer-readable storage medium that provides storage functionality to store various data and/or program code associated with operation of the controller 140 and/or other components of the temperature probe 104, such as software programs and/or code segments, temperature sensor 132 or 136 calibration data, or other data to instruct the controller and/or other components to perform the functionality described herein. For example, the memory 148 may include one register for storing data for NIST traceability, and another register for storing the temperature offset for calibration. Thus, the memory can store data, such as a program of instructions for operating the temperature probe 104 or other components. It should be noted that while a single memory 148 is described, a wide variety of types and combinations of memory 148 (e.g., tangible, non-transitory memory) can be employed. The memory can be integral with the controller, can comprise stand-alone memory, or can be a combination of both. Some examples of the memory 148 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 152 can be operatively configured to communicate with components of the controller 140 and other components of the system 100. For example, the communication interface 152 can be configured to retrieve data from the controller 140 or other components, transmit data for storage in the memory 148, retrieve data from storage in the memory 148, and so forth. The communication interface 152 can also be communicatively coupled with controller 140 and/or system elements to facilitate data transfer between system components. It should be understood that the probe control unit 112, the device management service 116 and the network monitoring system 108 may each have a controller 140 (e.g., including one or more processors 144, memory 148, and a communication interface 152) configured to perform the functionality of the probe control unit 112, the device management service 116 and the network monitoring system 108 as described herein.

Figure 2:
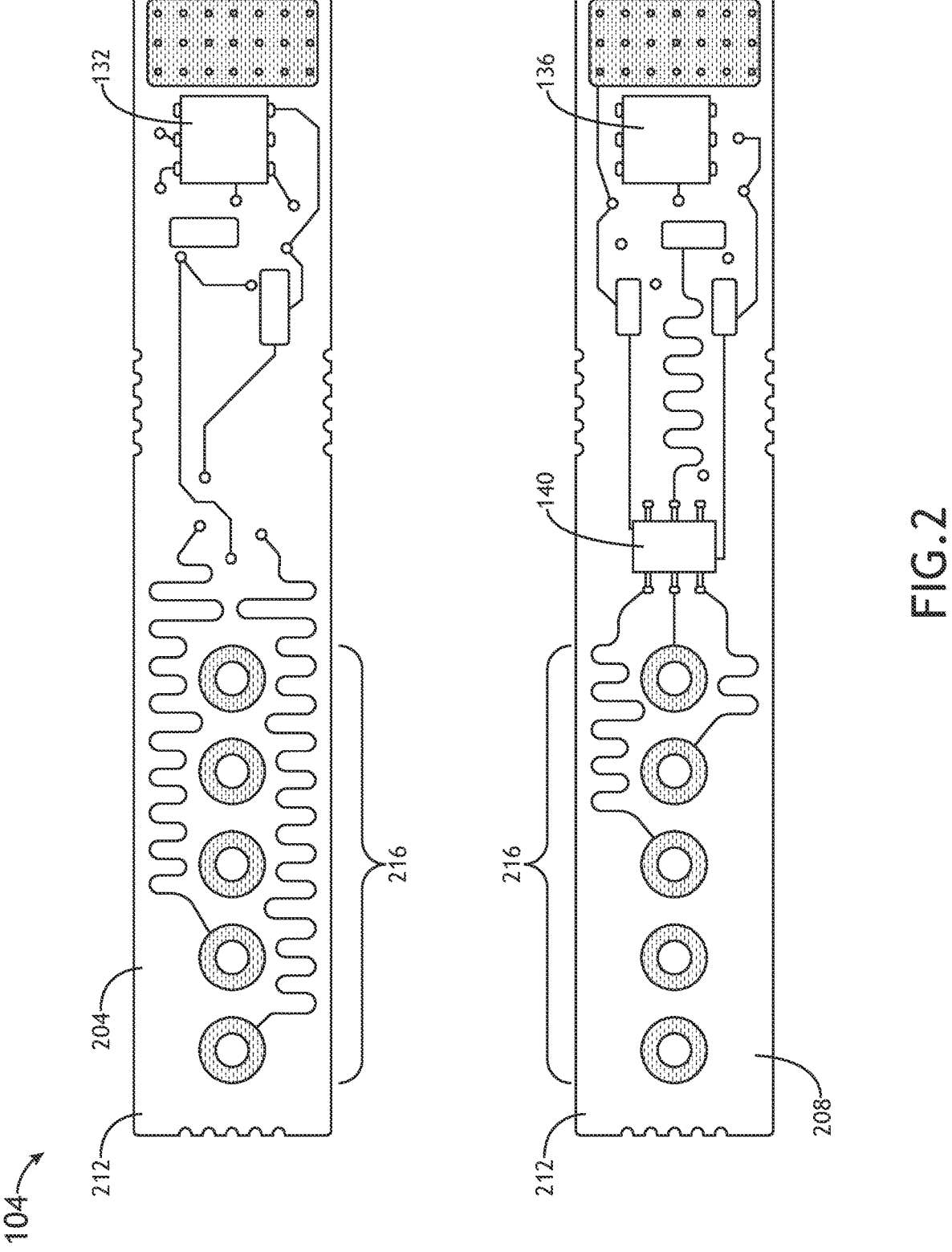
FIG. 2 is a simplified schematic view illustrating the obverse side and reverse side of a temperature probe, in accordance with one or more embodiments of the disclosure.

FIG. 2 is simplified schematic view illustrating an obverse side 204 (e.g., a first side) and a reverse side 208 (e.g., a second side) of a temperature probe 104, in accordance with one or more embodiments of the disclosure. Components of the temperature probe 104 may be disposed upon both sides of a circuit board substrate 212. For example, the first sensor 132 may be disposed on the obverse side 204, with the second sensor 136 disposed on the reverse side 208. The controller 140 may be disposed on either the obverse side 204 or the reverse side. An array of connectors 216 are connectable to wiring (e.g., power or ground). Components disposed on the circuit board substrate 212 many include other componentry required for functionality of the temperature probe 104 including, but not limited to, antennas (e.g., a cellular antenna), batteries, power interfaces, transmitters, receivers, voltage regulators, and other sensors. For example, the temperature probe 104 may further include a humidity probe. In another example, the temperature probe 104 may include an accelerometer (e.g., to detect if the freezer is being moved or stolen).

The circuit board substrate 212 may be of any size or shape. For example, the circuit board substrate 212 may be configured as a rectangle, with a length of approximately 25 mm and a width of approximately 4.5 mm. In another example, the circuit board substrate 212 may be configured as a 25 mm×33 mm rectangle. In another example, the circuit board substrate may be configured as a 25×20 mm rectangle. In another example, the circuit board substrate 212 and the electronic componentry of the temperature probe 104 together may have a maximal thickness (e.g., height) of approximately 2.4 mm. In another example, the circuit board substrate 212 and the electronic componentry of the temperature probe 104 together may have a maximal thickness (e.g., height) of approximately 3.5 mm. It is noted herein that the dimensions of the circuit board substrate 212 should not be interpreted as limitations on the scope of the present disclosure.

The first sensor 132 and the second sensor 136 each are traceable in accordance with the National Institute of Standards and Technology (NIST), and may have specific accuracy ranges including but not limited to ±0.001, C±0.01° C., ±0.1° C., ±0.15° C., ±0.2° C., ±0.25° C. or ±0.3° C. The ranges may be dependent on temperature. For example, the first sensor 132 and/or the second sensor 136 may have an accuracy of ±0.1° C. when measuring temperatures within −20° C. to 50° C.

In embodiments, data collected from the first sensor 132 and the second sensor 136 are compared to each other to ensure accuracy. Temperature sensor accuracy can drift over time. By measuring differences in readings between the first sensor 132 and the second sensor 136, a faulty sensor may be identified, and an alert (e.g., sent by the alerting subsystem 124) may be sent to the end user warning of potential sensor malfunction. Logic within the temperature probe 104, the probe control unit 112, and/or the network monitoring system 108 may be used to continually compare data received from the first sensor 132 and the second sensor 136 to detect accuracy drift. Accuracy drift may be defined by any number of sets of parameters, depending on sensor technology and monitoring objectives. For example, accuracy drift may be defined as drift between sensors of more than 0.2° C. of each other at 0° C.

If accuracy drift is detected, each temperature probe 104 may be adjusted with a temperature offset to match a NIST reference temperature. For example, the temperature probe 104 may be adjusted by setting the device offset to read a net temperature of 0.0000° C., while immersing the probe in a distilled water/ice bath, ensuring that both the first sensor 132 and the second sensor 136 are within +0.1° C., while adjusting the offset to read 0.0000° C. In embodiments, the first sensor 132 and the second sensor 136 each have calibration offsets stored in memory 148, allowing the first sensor 132 and the second sensor 136 to perform independent internal calibrations. The use of both the first sensor 132 and the second sensor 136 allows for continuous reading and comparison of values resulting high accuracy and low drift that may extend the life of the temperature probe (e.g., extending beyond 10 years). Because the first sensor 132 and the second sensor 136 are digital and store their own calibration offset, temperature probe accuracy can be validated independent from the rest of the temperature monitoring system 100.

Figure 3:
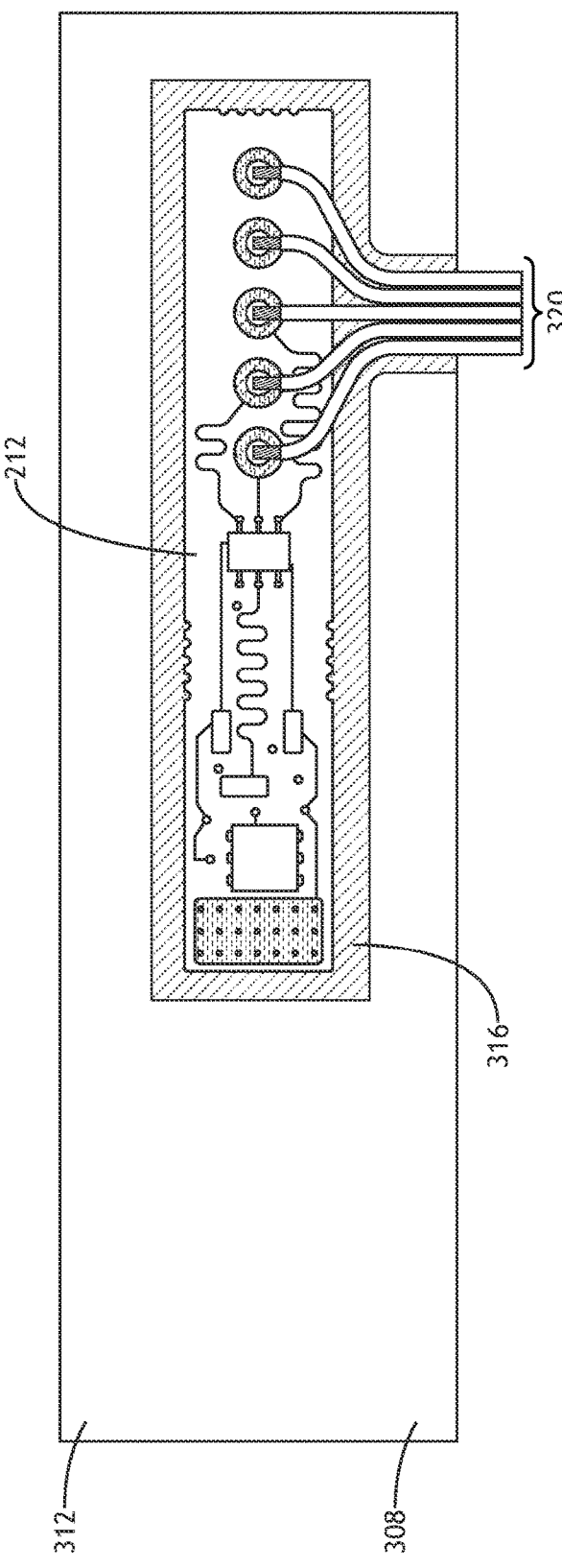
FIG. 3 is a simplified schematic view illustrating a probe housing for a temperature probe, in accordance with one or more embodiments of the disclosure.

FIG. 3 is simplified schematic of a probe housing 312 for the temperature probe 104, in accordance with one or more embodiments of the disclosure. The probe housing 312 protects the electronic componentry of the temperature probe 104 from damage. The probe housing 312 and/or the temperature probe 104 may mimic, or is approximately equivalent to, the size, shape and/or mass of a representative storage vessel. For example, the temperature probe and/or probe housing may be configured with a mass within 10% of the representative sample or representative storage vessel. The temperature probe 104 and/or probe housing 312 may be configured with a temperature response profile (TRP) similar to, or functionally equivalent to, a TRP of the representative sample or storage vessel. The TRP may be defined as the rate of change of the temperature of an object in an environment. In this manner an object, such as the probe housing 312, with a similar TRP as that of a representative sample or storage vessel can more effectively predict the temperature of the representative sample or storage vessel. For example, a probe housing 312 that mimics the TRP of a vaccine storage vessel may be configured as a vaccine simulation device (VSD). For instance, the probe housing 312 may be configured as a VSD in the form as described in the NSF/ANSI 456-2021a protocol "Vaccine Storage", which has been incorporated by reference in its entirety. NSF/ANSI 456-2021a describes a VSD as a block of aluminum with a hole for inserting a thermocouple or digital thermometer probe. The size of the VSD is intended to mimic the TRP of an individual vaccine vial. As such, the probe housing 312 may be designed to include a TRP similar to the VSD as described in the NSF/ANSI 456-2021a standard.

Besides mimicking the TRP of the representative sample or storage vessel, the probe housing 312 may mimic the size, shape, and/or mass of the representative sample or storage. The probe housing 312 may also mimic the TRP, size, shape, and/or mass of other sample, sample container or storage vessel types including but not limited to specimen vials, test tubes, boxes, sample tubes (e.g., 1.5 ml Eppendorf tubes), and the like. The probe housing 312 may also mimic the size, shape, and/or mass of non-medical samples, such as food samples. For example, the probe housing 312 may mimic the size, shape, and/or mass of an egg.

The probe housing 312 may be configured with a recess 316 built into the probe housing 312 to fit the circuit board substrate 212 and all electronic componentry of the temperature probe 104 at least partially into the recess. For example, the recess 316 may be formed within a surface 308 of the probe housing 312, allowing the circuit board substrate 212 to fit inside the recess 316. The circuit board substrate 212 may be embedded within the recess 316 via an adhesive or epoxy. For example, the circuit board substrate 212 may be embedded within a thermally conductive, electrically resistive epoxy. In some embodiments, the probe housing 312 includes a back layer configured to sandwich the circuit board substrate 212 between the probe housing 312 and the back layer. For example, the back layer may be adhered to the probe housing 312 and the circuit board substrate 212 via epoxy. FIG. 3 also demonstrates wires 320 attached to the connectors 216. The recess 316 may be configured so that the wires 320 fit into the recess 316.

Figure 4A:
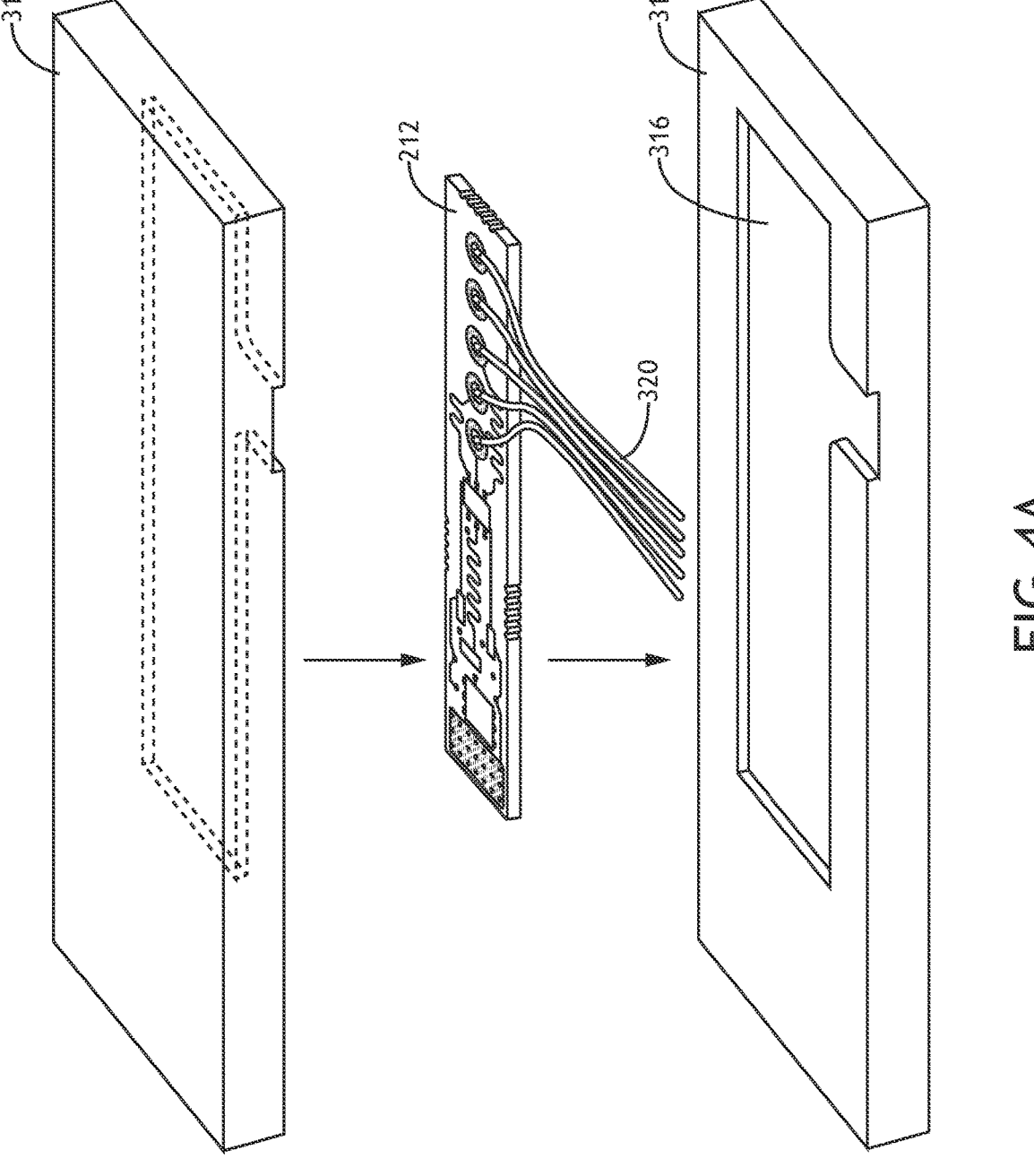
FIGS. 4A-4B are exploded assembly views illustrating the placement of a temperature probe between a first probe housing piece and a second probe housing piece, in accordance with one or more embodiments of the disclosure.
Figure 4B:
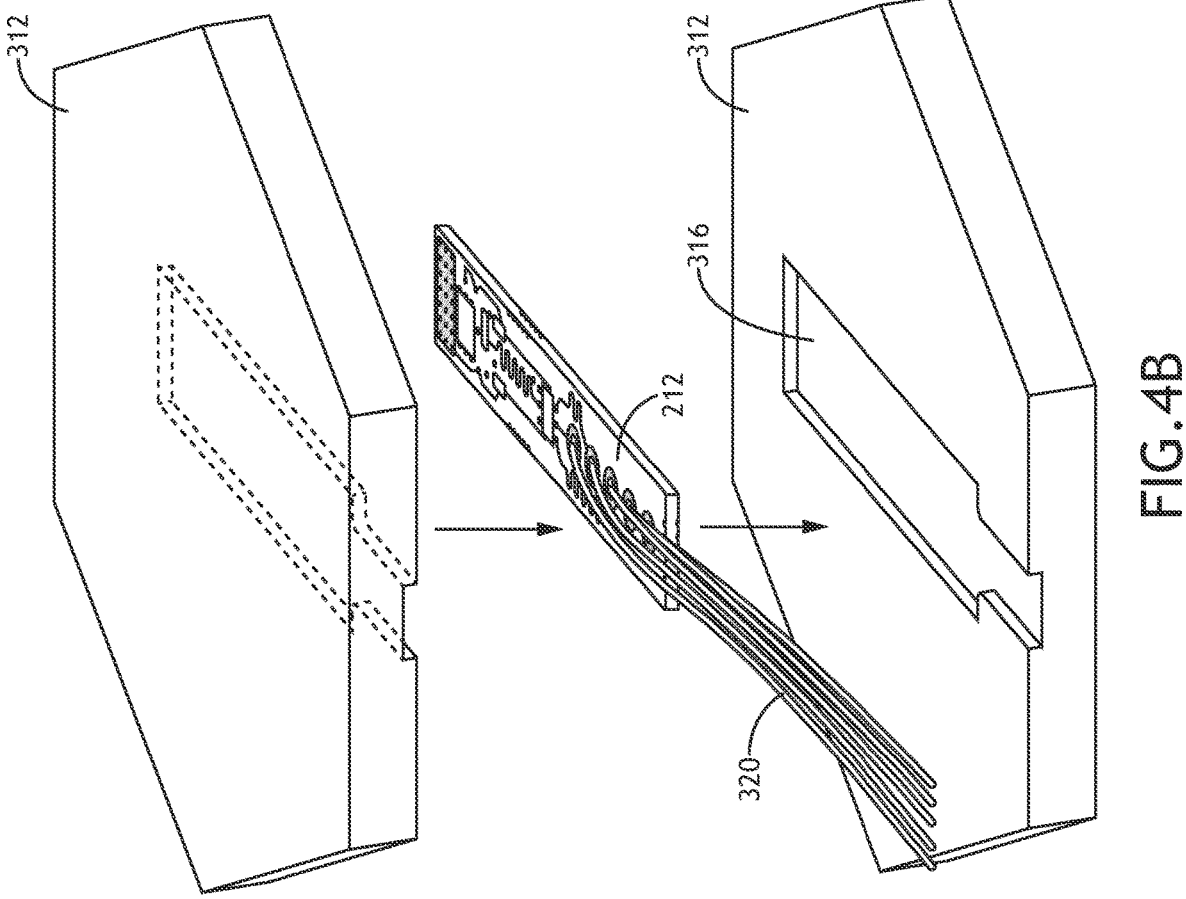

FIGS. 4A-4B are assembly views depicting the assembly of two probe housing 312 pieces and the circuit board 212, in accordance with one or more embodiments of the disclosure. FIG. 4A depicts a rectangularly-shaped probe housing design and FIG. 4B depicts a hexagonally-shaped probe housing design. For example, the probe housing 312 may be configured as a rectangular prism (e.g., see FIG. 4A) with a mass of approximately 22 grams, a flattened rectangular prism with a mass of approximately 11 grams, a flattened rectangular prism with a mass of approximately 6 grams, a flattened rectangular prism with a mass of approximately 5 grams, or a flattened hexagonal prism (e.g., see FIG. 4B). It is noted herein that the scope of the present disclosure is not limited to the shape and/or size of the probe housing design. For example, the probe housing 312 may take on any shape including, but not limited to, a cube, a flattened rectangle, a flattened hexagon, a flattened octagon, a trapezoidal prism, a sphere, an ellipsoid, or a cylinder.

As shown in FIGS. 4A and 4B, the circuit board 212 may be placed on a first probe housing piece 312 and a second probe housing piece 312 may be placed above the first probe housing piece 312 and the circuit board 212. In this sense, the circuit board 312 may be sandwiched between two opposing probe housing pieces 312 and locked into the combined recess that is formed from the individual recesses 316 in each individual probe housing piece 312.

For installation, the temperature probe 104 may be laid on top of a rack or other surface within a refrigerator/freezer, or attached to an inside wall of the refrigerator/freezer. For example, for wall mounting, the temperature probe 104 may be enclosed in a plastic box/container that is then mounted to the wall via magnets, screws, or other connecting elements.

Figure 5:
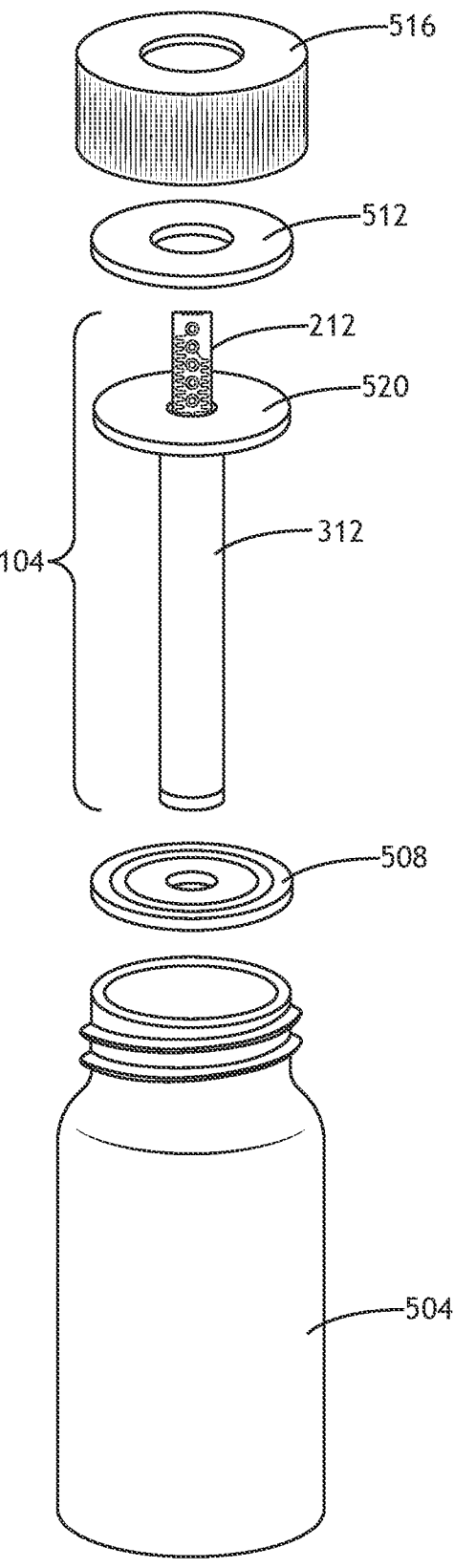
FIG. 5 is an exploded assembly view illustrating a probe housing configured as a bottle insert, in accordance with one or more embodiments of the disclosure.

FIG. 5 is an assembly view a probe housing 312 configured as a bottle insert, in accordance with one or more embodiments of the disclosure. The circuit board substrate 212 may be inserted into the probe housing 312*f* (e.g., as shown in FIG. 5). In embodiments, epoxy may be used to stabilize the circuit board substrate 212 within the probe housing 312. The temperature probe 104 may then be inserted into bottle 504. A thermal buffer (e.g., ethylene glycol, propylene glycol, glass beads, or a solution containing some proportion of propylene glycol and water mixture to mimic the thermal conductivity of a representative sample) may be added to the bottle. Together, the thermal buffer and the probe housing 312, act to mimic the size, shape, and/or mass of a sample, similar to the VSD. One or more probe gaskets 508 may be placed onto the tip of the probe housing 312 to prevent the tip from touching or breaking the sides of the bottle 504. A lid gasket 512 may be placed on top of the probe housing 312 to prevent spillage. The lid gasket 512 may be secured into place via a lid 516. The bottle 504 may be filled with any amount of thermal buffer including, but not limited to, 15 ml (e.g., for 20 ml vials) and 50 ml. In some embodiments, the thermal buffer comprises a particulate material (e.g., glass balls or beads). The probe housing 312 may include a ring portion 520 that conforms to the neck of the bottle 504, keeping the tip of the probe housing 312 centered within the bottle 504. The ring portion 520 may have a diameter of any size (e.g., depending on the size of the bottle 504) including, but not limited to, 22 mm.

The probe housing 312 may be constructed of any material including, but not limited to, metal, glass, or plastic. For example, the probe housing 312 may be constructed of aluminum. The probe housing 312 may also include an outside layer that protects and/or provides a design or information that can be permanently labeled (e.g., via laser etching). For example, the probe housing 312 may include an outside layer comprising anodized aluminum. The labeling on the outside layer may include serial numbers and other information for traceability purposes. The permanence of the labeling and unique identifiers stored in memory 148 ensures that the calibration history of the temperature probe 104 can be referenced over the service life of the temperature probe 104.

The temperature monitoring system 100 is not limited by the number or placement of temperature probes within the freezer. For example, a temperature monitoring system 100 monitoring a vaccine freezer may include any number of temperature probes 104 within the vaccine freezer including, but not limited to, two temperature probes 104, four temperature probes 104, 8 temperature probes, 16 temperature probes 104, 64 temperature probes 104, or 128 temperature probes 104. The temperature monitoring system 100 may also monitor sets of temperature probes 104 installed in separate freezers. For example, the temperature monitoring system 100 may monitor four temperature probes 104 in a first freezer, and 64 temperature probes 104 in a second freezer.

FIG. 6 is flow diagram illustrating a method 600 for communicating temperature data to an end user via the temperature monitoring system 100, in accordance with one or more embodiments of the disclosure. For example, the method 600 may be used to notify a medical worker that a vaccine freezer is malfunctioning.

In one or more embodiments, the method 600 includes a step 610 of generating a first temperature signal and a second temperature signal. For example, the first temperature signal may be generated by the first sensor 132, and the second temperature signal may be generated by the second sensor 136. The first temperature signal and the second temperature signal are generated and recorded within the same time period (e.g., within one second).

In one or more embodiments, the method 600 further includes a step 620 of generating comparison data based on the first temperature signal and the second temperature signal. For example, the temperature probe 104 may determine, via the one or more controllers 140 that data from the first temperature signal and the second temperature signal indicate that the temperature values reported by the first sensor 132 and the second sensor 136 are within predetermined tolerances (e.g., ±0.2° C.), further indicating that the first sensor 132 and the second sensor 136 are working properly.

In one or more embodiments, the method 600 further includes a step 630 of transmitting a data signal to the network monitoring system 108 based on at least one of the first temperature signal, the second temperature signal, or the comparison data. For example, the network monitoring system 108 may receive data from the temperature probe, via the probe control unit 112, demonstrating that the first sensor 132 and the second sensor 136 are working properly (based on the comparison data), but that the temperature data received from the temperature probe is higher than a previously determined limit (e.g., warmer than −20° C.).

In one or more embodiments, the method includes a step 640 of generating a report or an alert based on the data signal. For example, if data received from the temperature probe indicates a malfunctioning first sensor 132 or a temperature higher than a previously determined limit, the network monitoring system will initiate an alert via the alerting subsystem 124.

In one or more embodiments, the method includes a step 650 of transmitting the report or the alert to an end user. For example, the alerting subsystem 124 may send the alert to the end user via SMS messaging. In another example, the alerting subsystem 124 may send the alert to the end user via email.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

Although particular embodiments of this invention have been illustrated, it is apparent that various modifications and embodiments of the invention may be made by those skilled in the art without departing from the scope and spirit of the foregoing disclosure. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Accordingly, the scope of the invention should be limited only by the claims appended hereto.

What is claimed:

1. A temperature monitoring system for a refrigerator or freezer comprising:

a temperature probe comprising:

a circuit board substrate;

a first temperature sensor disposed on a first side of the circuit board substrate;

a second temperature sensor disposed on a second side of the circuit board substrate opposite the first side; and one or more controllers disposed on the circuit board substrate comprising:

one or more processors; and a memory communicatively coupled to the one or more processors, wherein the memory stores a set of program instructions, the set of program instructions configured to cause the one or more processors to:

receive a first temperature signal from the first temperature sensor;

receive a second temperature signal from the second temperature sensor, wherein the first temperature sensor and the second temperature sensor are disposed within the refrigerator or freezer;

generate accuracy drift data based on the first temperature signal and the second temperature signal; and transmit a data signal based on the accuracy drift data to a network monitoring system.

2. The system of claim 1, wherein the temperature probe is disposed within a probe housing.

3. The system of claim 2, wherein the probe housing includes a recess, wherein the circuit board substrate is at least partially enclosed within the recess.

4. The system of claim 3, wherein the probe housing comprises a first probe housing piece including a first recess and a second probe housing piece including a second recess, wherein the first probe housing piece and the second probe housing piece are configured to secure the circuit board with a volume defined by the first recess and the second recess.

5. The system of claim 3, wherein a temperature response profile of at least one of the probe housing or the temperature probe is approximately equivalent to a representative storage vessel.

6. The system of claim 3, wherein a mass of at least one of the probe housing or the temperature probe is approximately equal to a mass of a representative storage vessel.

7. The system of claim 6, wherein the representative storage vessel comprises a vaccine vial.

8. The system of claim 1, wherein at least one of the first temperature sensor or the second temperature sensor is configured as an integrated circuit.

9. A method for monitoring a refrigerator or freezer comprising:

receiving a first temperature signal from a first temperature sensor disposed on a first side of a circuit board substrate of a temperature probe;

receiving a second temperature signal from a second temperature sensor disposed on a second side of the circuit board substrate of the temperature probe opposite the first side, wherein the first temperature sensor and the second temperature sensor are disposed within the refrigerator or freezer;

generating accuracy drift data based on the first temperature signal and the second temperature signal; and transmitting a data signal based on the accuracy drift data to a network monitoring system.

10. The method of claim 9, wherein the temperature probe is disposed within a probe housing.

11. The method of claim 10, wherein the probe housing includes a recess, wherein the circuit board substrate is at least partially enclosed within the recess.

12. The method of claim 11, wherein a temperature response profile of at least one of the probe housing or the temperature probe is approximately equivalent to a representative storage vessel.

13. The method of claim 11, wherein a mass of at least one of the probe housing or the temperature probe is approximately equal to a mass of a representative storage vessel.

14. The method of claim 13, wherein the representative storage vessel comprises a vaccine vial.

15. A temperature monitoring system for a refrigerator or freezer comprising:
   a temperature probe disposed within a probe housing including a first probe housing piece and a second probe housing piece;
   a circuit board substrate;
   a first temperature sensor disposed on a first side of the circuit board substrate;
   a second temperature sensor disposed on a second side of the circuit board substrate opposite the first side; and
   one or more controllers disposed on the circuit board substrate comprising:
   one or more processors; and
   a memory communicatively coupled to the one or more processors, wherein the memory stores a set of program instructions, the set of program instructions configured to cause the one or more processors to:
      receive a first temperature signal from the first temperature sensor;
      receive a second temperature signal from the second temperature sensor, wherein the first temperature sensor and the second temperature sensor are disposed within the refrigerator or freezer;
      generate accuracy drift data based on the first temperature signal and the second temperature signal; and
      transmit a data signal based on the accuracy drift data to a network monitoring system.

16. A method for monitoring a refrigerator or freezer comprising:
   receiving a first temperature signal from a first temperature sensor disposed on a first side of a circuit board substrate of a temperature probe, the temperature probe disposed within a probe housing, the probe housing include a first probe housing piece and a second probe housing piece, the circuit board disposed within a volume between the first probe housing piece and the second probe housing piece;
   receiving a second temperature signal from a second temperature sensor disposed on a second side of the circuit board substrate of the temperature probe opposite the first side, wherein the first temperature sensor and the second temperature sensor are disposed within the freezer;
   generating accuracy drift data based on the first temperature signal and the second temperature signal; and
   transmitting a data signal based on the accuracy drift data to a network monitoring system.

17. The system of claim 3, wherein the probe housing comprises a first housing piece and a second housing piece, wherein the circuit board substrate is sandwiched between the first housing piece and the second housing piece.

18. The system of claim 17, wherein the first housing piece and the second housing piece and the second housing piece are substantially symmetrical.

19. The system of claim 3, wherein the probe housing is symmetric about a plane that intersects the circuit board such that the first temperature sensor and the second temperature sensors are positioned substantially symmetrical with respect to the housing.

20. The system of claim 3, wherein the probe housing is configured to be inserted into a bottle, wherein the probe housing comprises:
   a ring portion configured to conform to a neck of the bottle; and
   a tip configured to:
      receive the circuit board substrate; and
      be insertable into the bottle, wherein the ring portion is configured to keep the tip centered within the bottle when the ring portion conforms to the neck of the bottle.

* * * * *